United States Patent

Lai

[11] Patent Number: 5,871,299
[45] Date of Patent: Feb. 16, 1999

[54] QUICK-RELEASE MECHANISM FOR A COMPRESSING DEVICE

[76] Inventor: Ming-Tang Lai, No. 97, Chung He Street, Taiping City, Taichung Hsien, Taiwan

[21] Appl. No.: 951,434

[22] Filed: Oct. 16, 1997

[51] Int. Cl.⁶ .................................................. B25G 3/18
[52] U.S. Cl. ............... 403/322.1; 403/316; 403/DIG. 4; 222/390; 222/327; 74/424.8 A; 74/459
[58] Field of Search ..................................... 403/321, 322, 403/348, 315, 316, DIG. 4, 408.1; 222/390, 333, 327; 74/424.8 A, 459

[56] References Cited

U.S. PATENT DOCUMENTS

| | | | |
|---|---|---|---|
| 4,171,072 | 10/1979 | Davis, Jr. .............................. | 222/333 X |
| 4,180,187 | 12/1979 | Ben-Haim ........................... | 222/390 X |
| 4,306,671 | 12/1981 | Fisher ................................... | 222/390 X |
| 4,986,690 | 1/1991 | Cooksey ............................... | 403/348 X |
| 5,052,593 | 10/1991 | Grome et al. ........................ | 222/390 X |
| 5,104,005 | 4/1992 | Schneider et al. ................... | 222/390 X |
| 5,341,958 | 8/1994 | Bayat et al. ......................... | 222/390 X |
| 5,762,239 | 6/1998 | Cossette .............................. | 222/333 X |

*Primary Examiner*—Brian K. Green
*Assistant Examiner*—William L. Miller
*Attorney, Agent, or Firm*—Charles E. Baxley, Esq.

[57] ABSTRACT

A quick-release mechanism includes a screw shaft rotatably extending through a first member, a central hole of a gear and a second member, the first member having a slot defined therein so that a plate is movably received therein which has a notch portion defined in a front end thereof so as to engage with the screw shaft and a first protrusion extending upwardly from a rear end thereof. The screw shaft has a groove longitudinally defined in an outer periphery thereof and the gear has a second protrusion extending inwardly and radially-from a periphery defining the central hole so that the second protrusion is received in the groove. A bolt is threadedly inserted into the first member and contacts the rear end of the plate which has a spring mounted thereto so as to bias the plate toward the bolt. A pinion driven by a motor is engaged with the gear so as to drive the gear and the screw shaft. The screw shaft is allowed to be pulled directly when the plate is disengaged from the screw shaft.

2 Claims, 5 Drawing Sheets

5,871,299

QUICK-RELEASE MECHANISM FOR A COMPRESSING DEVICE

BACKGROUND OF THE INVENTION

1. Field of the Invention

The present invention relates to a quick-release mechanism and, more particularly, to an improved quick-release mechanism for a compressing device so as to pull a screw shaft quickly.

2. Brief Description of the Prior Art

A compressing device is generally used to compress a tube of silicon gel, for example, to fill cracks defined in objects. Generally, the compressing device is driven by electrical power and has a screw shaft rotatably moved forwardly to compress the tube of silicon gel so as to extrude the silicon gel from an outlet of the tube. In order to fill cracks steady, the screw shaft is controlled to move slowly so that a user is allowed to operate the compressing device properly and carefully. When the tube of the silicon gel is run out, the screw shaft should be moved rearwardly to its original position so as to be ready for next operation. However, the screw shaft can only be moved slowly by reversely actuating a mechanism which drive the screw shaft. Therefore, the user has to wait for a period of time and this wastes electricity. Although to arrange a gear shifting mechanism to pull the screw shaft quickly is possible, it will increase a manufacturing cost of the device.

The present invention intends to provide an improved quick-release mechanism for a compressing device to mitigate and/or obviate the above-mentioned problems.

SUMMARY OF THE INVENTION

In accordance one aspect of the present invention, there is provided a quick-release mechanism comprising a first member being adapted to be disposed in a casing and having a slot longitudinally defined in an upper end thereof, a first passage defined longitudinally therethrough and communicating with the slot. A first hole is defined transversely through the first member and communicates with the slot and the first passage.

A plate is movably received in the slot and has a notch portion defined in a front end thereof and a first protrusion extending from a rear end thereof. A second member is adapted to be disposed in the casing and has a second hole defined transversely therethrough. A gear is disposed between the first and the second member and has a central hole defined therethrough. A second protrusion extends inwardly and radially from a periphery defining the central hole.

A screw shaft rotatably and movably extends through the first hole, the central hole and the second hole. A groove is longitudinally defined in an outer periphery of the screw shaft so as to receive the second protrusion therein.

A spring is mounted to the plate and a bolt is adapted to extend through the casing and threadedly inserted into the first passage to contact the rear end of the plate to let the notch portion of the plate be removably engaged with the screw shaft, and the plate is biased away from the first member. A pinion driven by a motor is engaged with the gear so that the screw shaft is rotatably moved by rotating the gear and pulled rearwardly directly with the plate being disengaged from the screw shaft.

It is an object of the present invention to provide a quick-release mechanism for a compressing device, wherein a screw shaft can be pulled rearwardly directly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
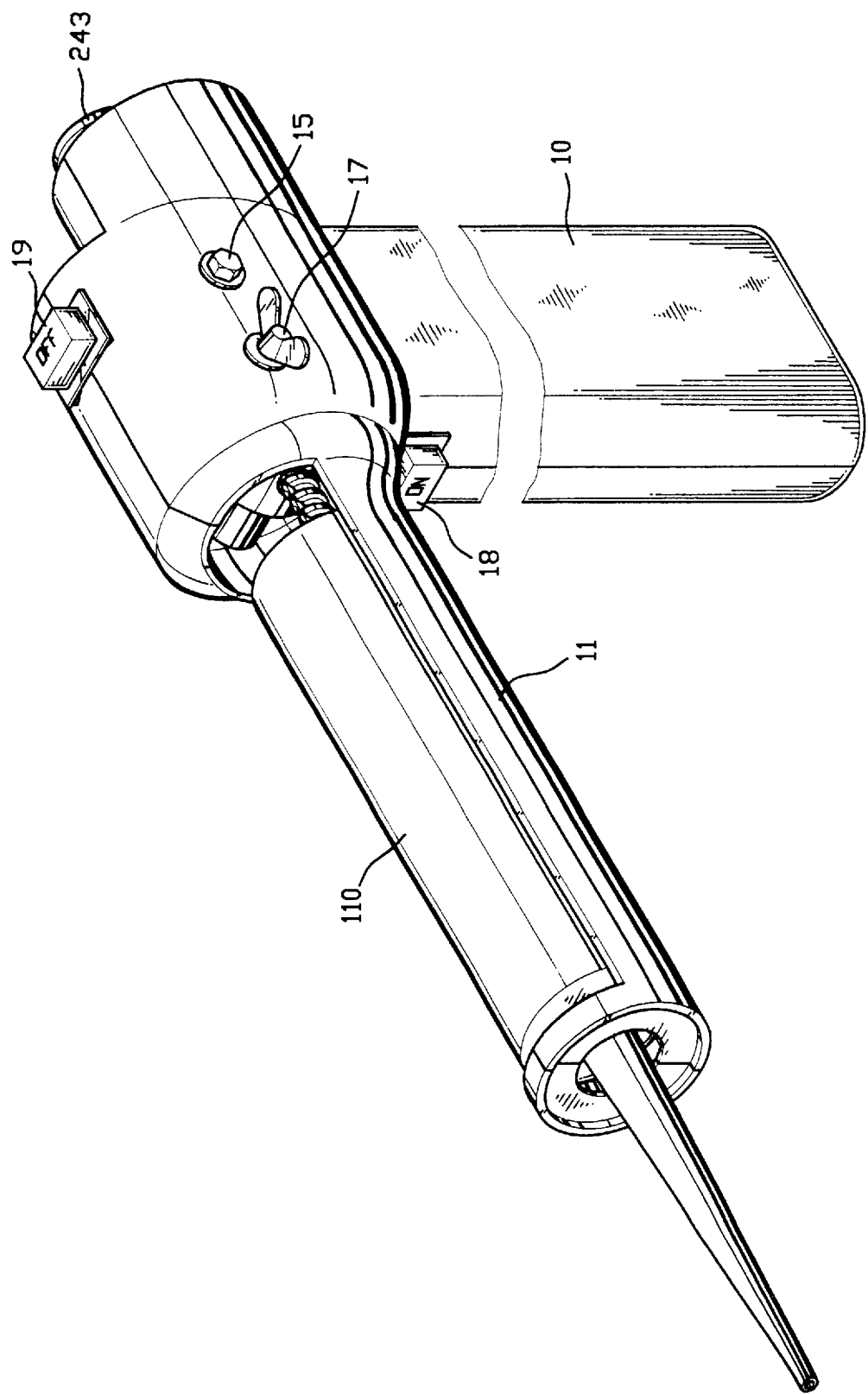
FIG. 1 is a perspective view of a compressing device with a quick-release mechanism in accordance with the present invention.
Figure 2:
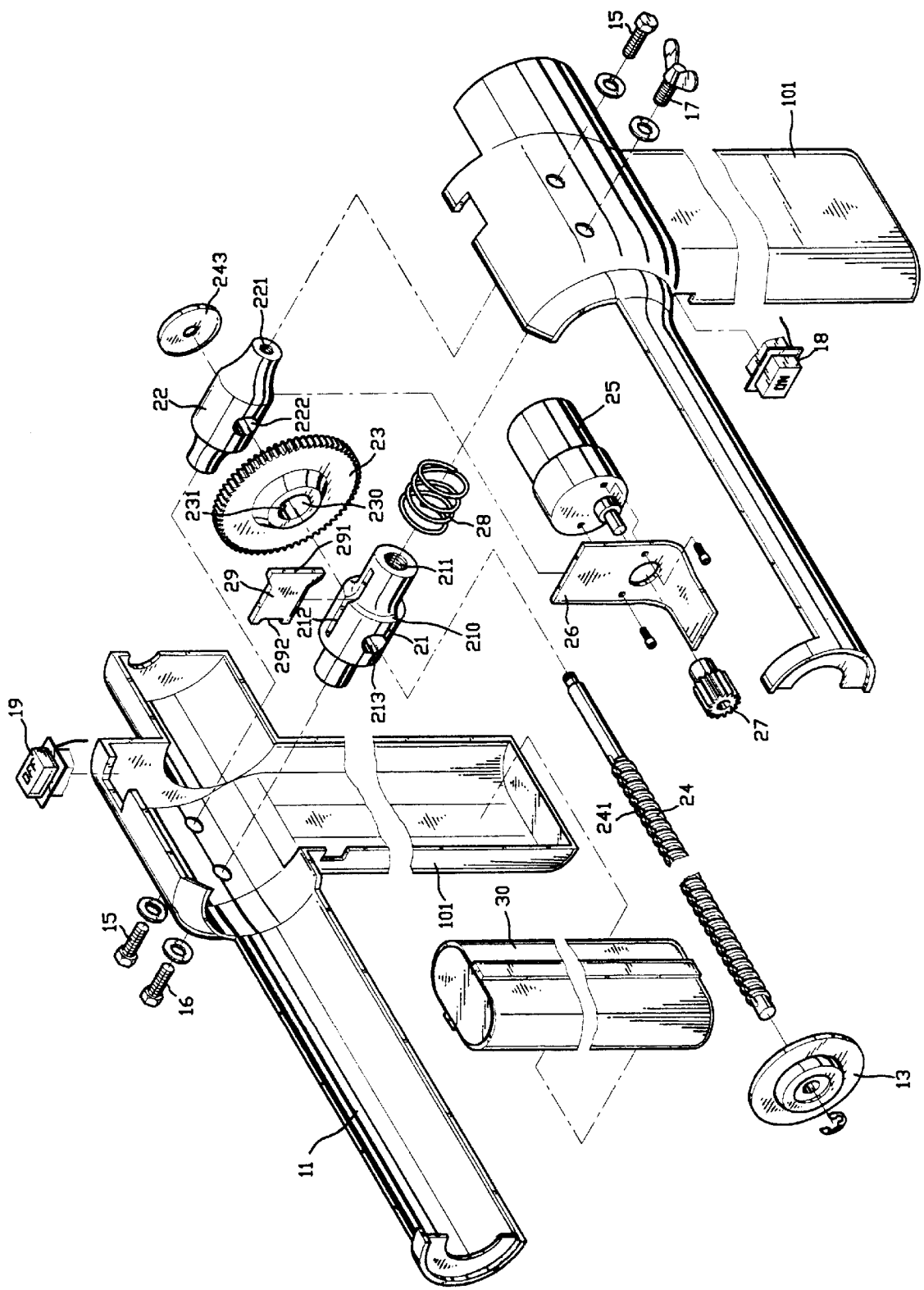
FIG. 2 is an exploded view of the quick-release mechanism in accordance with the present invention.
Figure 3:
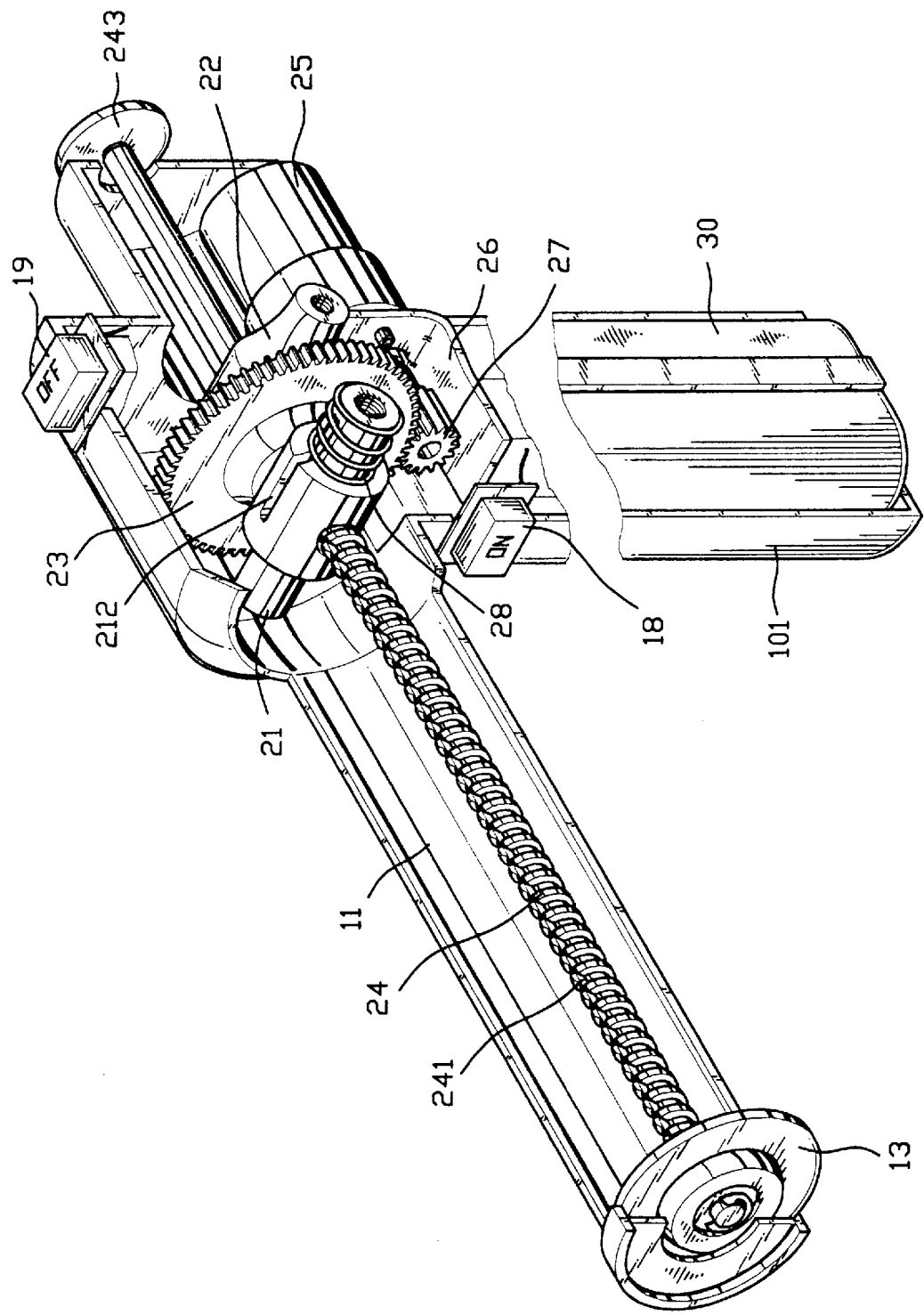
FIG. 3 is a perspective view, partly removed for clarity, of the compressing device with the quick-release mechanism disposed therein.

Referring to the drawings and initially to FIGS. 1 through 3, a compressing device generally includes a casing 10 composed of a first part and a second part, each of the first and the second part having a handle portion 101 so as to receive a battery 30 therein, and an elongated portion 11 for receiving a tube 110 of silicone gel therein. A quick-release mechanism in accordance with the present invention generally includes a first member 21 disposed in the casing 10 and having a slot 212 longitudinally defined in an upper end thereof. A first passage 211 is defined longitudinally therethrough and communicating with the slot 212. A first hole 213 is defined transversely through the first part 21 and communicates with the slot 212 and the first passage 211.

A plate 29 is movably received in the slot 212 and has a notch portion 292 defined in a front end thereof and a first protrusion 291 extending from a rear end thereof. A spring 28 is mounted to the plate 29 and biased between the first protrusion 291 and a shoulder portion 210 formed to the first member 21. A bolt 17 extends through the casing 10 and is threadedly inserted into the first passage 211, another bolt 16 extending through the casing 10 and threadedly inserted into the other end of the first passage 211 to position the first member 21.

A second member 22 is disposed in the casing 10 and has a second hole 222 defined transversely therethrough. A second passage 221 is defined in the second member 22 so that the second member 22 is positioned by two bolts 15 respectively extending through the casing 10 and threadedly inserted into the second passage 221.

A gear 23 is disposed between the first and the second member 21, 22. The gear 23 has a central hole 230 defined therethrough and a second protrusion 231 extends inwardly and radially from a periphery defining the central hole 230 so that a screw shaft 24 is rotatably and movably extending through the first hole 213, the central hole 230 and the second hole 222. The screw shaft 24 has a groove 241 defined longitudinally in an outer periphery thereof so as to receive the second protrusion 231 therein. The screw shaft 24 has a board 13 fixedly connected to a front end thereof and a handle 243 fixedly connected to a rear end thereof.

Figure 4:
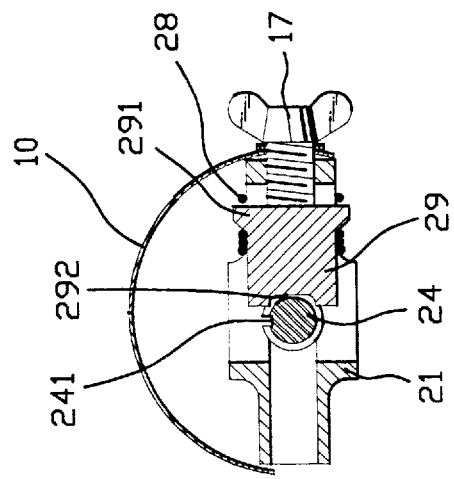
FIG. 4 is an end plan view to show a plate which is engaged with a screw shaft of the quick-release mechanism.
Figure 5:
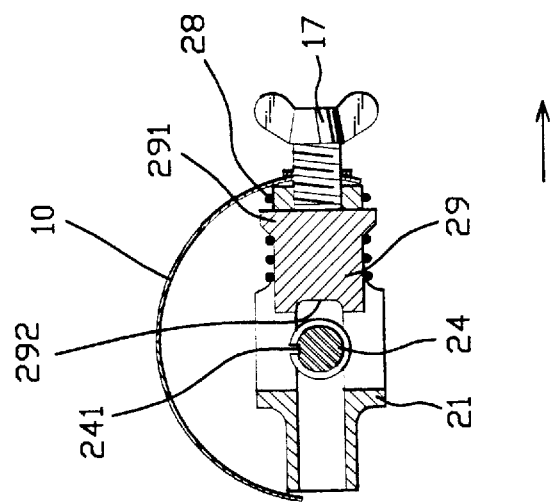
FIG. 5 is an end plan view to show when the plate shown in FIG. 4 is disengaged from the screw shaft of the quick-release mechanism.

Referring to FIGS. 4 and 5, the bolt 17 contacts the rear end of the plate 29 so as to let the notch portion 292 of the plate 29 be removably engaged with the screw shaft 24. The plate 29 is biased away from the first member 21. A frame 26 is disposed beneath of the gear 23 so as to connect a motor 25 which drives a pinion 27 which is engaged with the gear 23. Two buttons 18, 19 are respectively disposed to the casing 10 and control the motor 25 which is powered by the battery 30.

Figure 6:
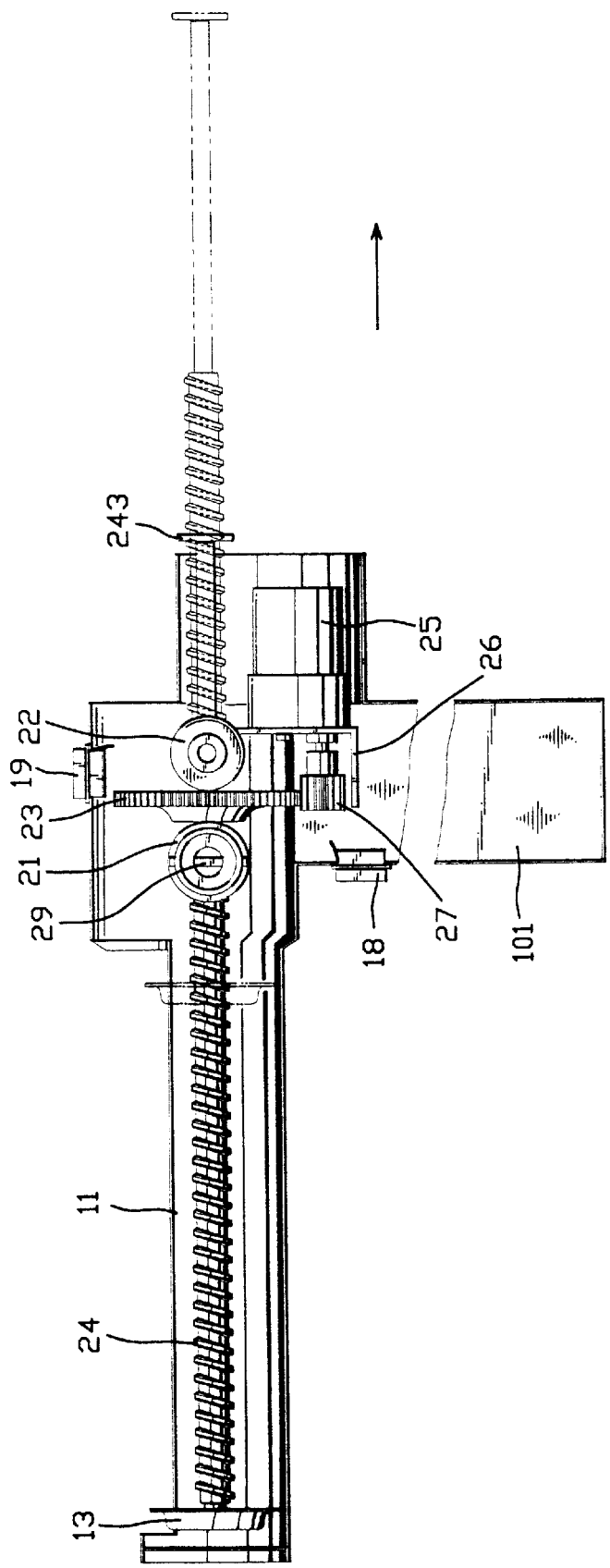
FIG. 6 is a side elevational view to show the screw shaft is pulled directly.

In operation, the gear 23 is rotated by the pinion 27 driven by the motor 25 so as to let the screw shaft 24 rotatably move to compress the tube 110 of silicone gel by the board 13. When the silicone gel is run out, the screw shaft 24 has to be pulled rearwardly so as to replace a new tube 110 of silicone gel in the elongated portion 11, the bolt 17 is reversely rotated to disengage the notch portion 292 of the plate 29 from the screw shaft 24 and then, referring to FIG. 6, a user simply holds the handle 243 and pulls the screw shaft 24 while the second protrusion 231 is received in the groove 241.

Although the invention has been explained in relation to its preferred embodiment, it is to be understood that many other possible modifications and variations can be made without departing from the spirit and scope of the invention as hereinafter claimed.

What is claimed is:

1. A quick-release mechanism for a compressing device having a casing, comprising:

a first member being adapted to be disposed in said casing and having a slot longitudinally defined in an upper end thereof, a first passage defined longitudinally therethrough and communicating with said slot, a first hole defined transversely therethrough and communicating with said slot and said first passage;

a plate movably received in said slot and having a notch portion defined in a front end thereof and a first protrusion extending from a rear end thereof;

a second member being adapted to be disposed in said casing and having a second hole defined transversely therethrough;

a gear disposed between said first and said second member, said gear having a central hole defined therethrough and a second protrusion extending inwardly and radially from a periphery defining said central hole;

a screw shaft rotatably and movably extending through said first hole, said central hole and said second hole, said screw shaft having a groove defined longitudinally in an outer periphery thereof so as to receive said second protrusion therein;

a spring mounted to said plate and a bolt being adapted to extend through said casing and threadedly inserted into said first passage to contact said rear end of said plate, said notch portion of said plate being removably engaged with said screw shaft and said plate being biased away from said first member, and a pinion driven by a motor and engaged with said gear.

2. The quick-release mechanism as claimed in claim 1 wherein said screw shaft has a board fixedly connected to a front end thereof and a handle fixedly connected to a rear end thereof.

* * * * *